United States Patent
Janssen et al.

[11] Patent Number: 6,029,795
[45] Date of Patent: Feb. 29, 2000

[54] DEVICE FOR RECEIVING AND RELEASING SLAUGHTERED ANIMALS OR PARTS THEREOF

[75] Inventors: Cornelis Joannes Janssen, Holthees; Jan Willem Bos, Haps; Petrus Christianus Hendrikus Janssen, Wilbertoord; Adrianus Josephes van den Nieuwelaar, Gemert, all of Netherlands

[73] Assignee: Stork PMT B.V., Netherlands

[21] Appl. No.: 08/892,642

[22] Filed: Jul. 15, 1997

[30] Foreign Application Priority Data

Jul. 16, 1996 [NL] Netherlands ............................ 1003616
Nov. 1, 1996 [NL] Netherlands ............................ 1004408

[51] Int. Cl.[7] ................................................. B65G 29/00
[52] U.S. Cl. ..................................... 198/465.4; 198/478.1
[58] Field of Search .............................. 198/465.4, 478.1, 198/476.1, 483.1, 485.1, 486.1; 452/182, 183

[56] References Cited

U.S. PATENT DOCUMENTS

| | | |
|---|---|---|
| 4,034,440 | 7/1977 | van Mil . |
| 4,178,659 | 12/1979 | Simonds . |
| 4,845,144 | 8/1989 | de Greef . |
| 5,125,498 | 6/1992 | Meyn .................................... 198/465.4 |
| 5,306,203 | 4/1994 | Martin et al. .................... 198/465.4 X |

FOREIGN PATENT DOCUMENTS

| | | |
|---|---|---|
| 0 225 306 A2 | 6/1987 | European Pat. Off. . |
| 0 259 920 A1 | 3/1988 | European Pat. Off. . |
| 1 408 850 | 8/1965 | France . |
| 2 606 596 | 5/1988 | France . |
| 25 57 877 | 7/1977 | Germany . |
| 7412044 | 5/1976 | Netherlands . |
| 2 175 191A | 11/1986 | United Kingdom . |
| WO 93/13671 | 7/1993 | WIPO . |

OTHER PUBLICATIONS

Patent Cooperation Treaty (PCT) Report Concerning Novelty Search of International Type for The Netherlands Application No. 1003616.

*Primary Examiner*—James R. Bidwell
*Attorney, Agent, or Firm*—John S. Pratt; Kilpatrick Stockton LLP

[57] ABSTRACT

A conveyance device for receiving slaughtered animals or parts thereof at a first point and releasing slaughtered animals or parts thereof at a second point has a rotatable conveyance disc which is provided with slits along its circumference. Provision is made for a feed device for feeding the slaughtered animals or parts thereof to the conveyance disc at the first point, and for a discharge device for discharging the slaughtered animals or parts thereof from the conveyance disc at the second point. Each slit can support at least two slaughtered animals or parts thereof in a bearing manner.

42 Claims, 10 Drawing Sheets

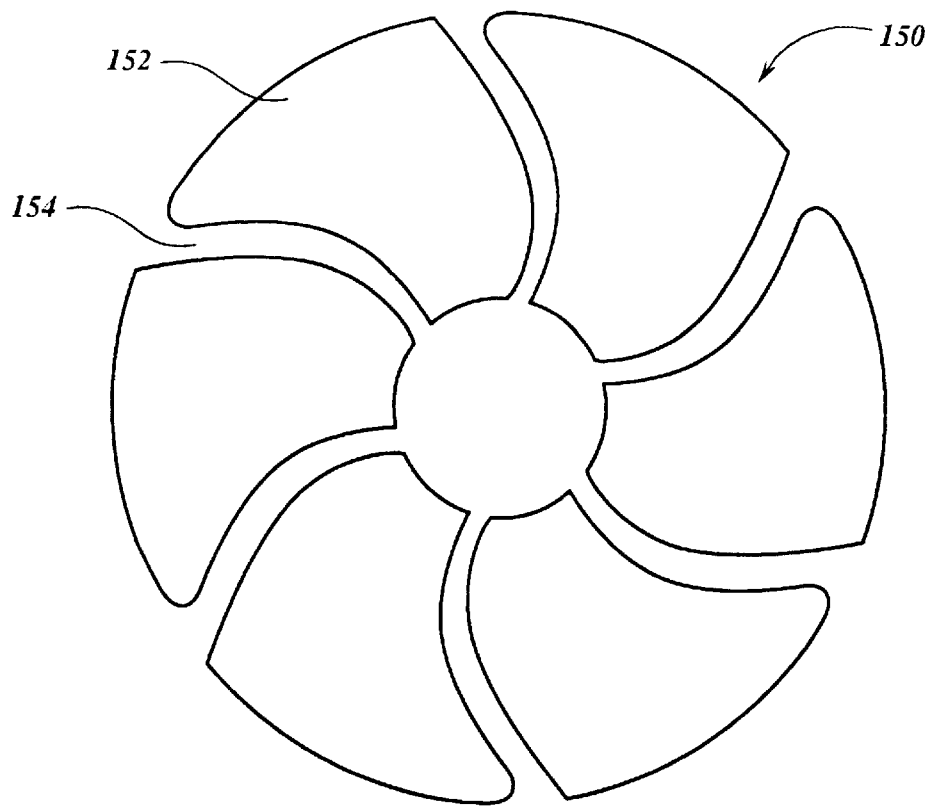
Fig. 15
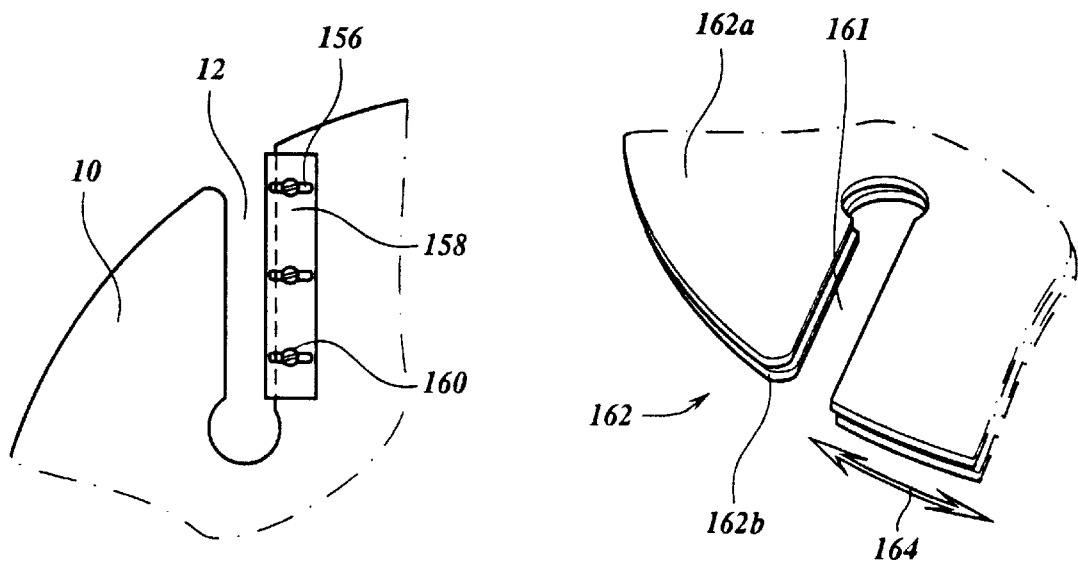
Fig. 16    Fig. 17

DEVICE FOR RECEIVING AND RELEASING SLAUGHTERED ANIMALS OR PARTS THEREOF

BACKGROUND OF THE INVENTION

This invention relates to a conveyor device for receiving slaughtered animals or parts thereof at a first point and releasing slaughtered animals or parts thereof at a second point, comprising a movable, endless conveyance means, along the path of which the first and the second point are situated, feed means for feeding the slaughtered animals or parts thereof at the first point to the conveyance means in a receiving position, and discharge means for discharging the slaughtered animals or parts thereof from the conveyance means at the second point, in a releasing position. The abovementioned first position and the abovementioned second position may be different, but they may also coincide.

DISCUSSION OF THE PRIOR ART

A prior art device is known from, for example, European Patent Application No. 0,259,920. This publication describes a device for selectively transferring poultry brought in on a feed conveyor, hanging by the legs from hooks, to at least one discharge station. The known device comprises as conveyance means a substantially annular, closed track extending between the feed conveyor and the discharge station, which is connected to a discharge conveyor. Overhanging hooks, which are supported by means of rollers and are provided with recesses and driven by a driving ring, can be moved along the annular track. The driving ring is connected by means of a friction connection to the overhanging hooks. In a receiving position of the conveyance means, a hook of the feed conveyor is situated opposite an overhanging hook of the conveyance means, so that the poultry can be transferred selectively from the hook of the feed conveyor to the overhanging hook of the conveyance means. In a releasing position of the conveyance means, an overhanging hook of the conveyance means is situated in the discharge station, for releasing poultry hanging from the overhanging hook at that point. The known device can buffer birds hanging from the overhanging hooks, one bird per hook, to a limited extent before releasing the birds in the discharge station to the discharge conveyor.

A disadvantage of the known device is its complex construction, which makes the production costs high and requires considerable assembly work. The device is difficult to clean because of its construction. It is also a disadvantage that the device has a small buffer capacity. Yet another disadvantage is that the device can work only according to the first-in, first-out principle, so that, although there can be selective feed, there cannot be selective discharge.

SUMMARY OF THE INVENTION

An object of the invention is to eliminate at least some of the abovementioned disadvantages and provide a device of the type mentioned above with a greatly reduced number of parts and correspondingly reduced cost, combined with greater ease of cleaning.

Another object of the invention is to increase the buffer capacity of the device and to improve the possibilities for use in the case of different products.

In addition, an object of the invention is to provide a device which can discharge slaughtered animals or parts thereof selectively, and in which the slaughtered animals or parts thereof can also be supplied selectively to the device.

In order to reach the abovementioned objects, the invention is characterized in that the conveyance means is provided with a number of slits which are open at least at a feed end, and which are each adapted for supporting in a bearing manner therein at least two slaughtered animals or parts thereof; in that the feed means are equipped for feeding the slaughtered animals or parts thereof to the feed end of one of the slits of the conveyance means; and in that the discharge means are adapted for discharging the slaughtered animals or parts thereof from one of the slits of the conveyance means via one end of the slit concerned.

At the abovementioned first and second point, the slaughtered animals or the parts thereof can be fed to or discharged from the conveyance means either mechanically or manually.

If the feed means consist of a feed conveyor, the speed of conveyance (continuous or intermittent) or the direction of conveyance of the feed conveyor need not be the same as that of the conveyance means of the conveyor device according to the invention. All that is important is that the conveyance means is situated in a predetermined receiving position at the moment when a slaughtered animal or a part thereof is fed thereto by the feed means, in which receiving position a feed end of a predetermined slit can receive the slaughtered animal or the part thereof. The same considerations apply mutatis mutandis as regards the interaction between the discharge means and the conveyance means.

The device can interact with, for example, a single conveyor line from which, on the basis of a predetermined selection criterion, slaughtered animals or parts thereof are removed and buffered in the conveyance means, if desired in a predetermined slit, which is taken into the receiving position at the moment when the slaughtered animal or the part thereof has to be removed from the conveyor line. The buffered products can then be replaced in the conveyor line in a predetermined manner.

The device according to the invention can also be operating as a transfer device for transferring slaughtered animals or parts thereof from a first conveyor line to a second conveyor line, which lines can run at different conveyance speeds and pitch distances (i.e. distances between successive slaughtered animals or parts thereof). Furthermore, the device can also interact with more than two conveyor lines, in which case in a first line, for example, slaughtered animals or parts thereof are brought in, and in a second and further lines selected slaughtered animals can be discharged, to different destinations.

In addition, the device according to the invention can be used as a transfer device for transferring slaughtered animals or parts thereof from two or more conveyor lines to a single conveyor line, which lines can run at mutually different speeds of conveyance and pitch distances.

It is also possible to bring together slaughtered animals or parts thereof which meet a particular selection criterion in each of the different slits of the conveyance means of the device and to eject them together at a predetermined point by means of suitable discharge means, for further processing such as packaging thereof.

Assuming that the device according to the invention interacts with a conveyor in which slaughtered animals or parts thereof are conveyed on or from carriers at fixed pitch distances, the distance between two successive carriers can then be the same as or different from the distance between the feed ends of the slits. The number of slits in the conveyance means of the device according to the invention can be either even or odd.

The slits preferably extend substantially in a horizontal plane, so that the slaughtered animals or parts thereof cannot shift in the slit through the effect of gravity.

In a preferred embodiment, one or more of the slits comprise a widened part in which the slaughtered animal or part thereof cannot be supported. This makes it easy to remove a slaughtered animal or part thereof from the slit by moving said animal or part thereof by means of a guide or the like along the slit to the widened part thereof. In a further preferred embodiment, the widened parts of the slits coincide and consist of an opening connecting to ends of the slits.

The conveyance means is expediently formed by a rotatably driven disc or flat ring which is provided with the slits along the outer circumference, or inner or outer circumference thereof respectively. Such a conveyance means is simple and cheap to manufacture and easy to clean. In order to ensure that the conveyance means can receive the slaughtered animals or parts thereof easily in motion, the axis of the slits at one end thereof is preferably directed at an acute angle to the radial line from said end to the centre point of the disc or ring. Said angle can be, for example, about 5–35°.

In a first advantageous embodiment, the conveyance means has at least eight slits, each for at least three slaughtered animals or parts thereof.

In an alternative preferred embodiment, the conveyance means is formed by a conveyor with a number of carriers to be moved along, each bearing an element with one or more slits. Such a conveyor can be an overhead conveyor track with carriers in the form of trolleys movable along a rail, but it can also comprise a system of supports which are slidable along a rail. For an efficient supply and discharge of slaughtered animals or parts thereof, the axis of the slits at one end thereof is directed at an acute or a right angle to the direction of movement of the carriers.

Another alternative conveyance means is formed by a rotatably driven ring, bearing one or more elements which each define one or more slits. The ring can extend in a horizontal plane, but can also extend in a vertical plane. In the latter case the elements provided with slits are preferably designed in such a way that the slits extend substantially in the horizontal direction, and the elements are each rotatable about an axis parallel to the axis of the slits.

A circle segment-shaped guide is expediently fitted near one end of the slits, substantially parallel to the outer circumference of the abovementioned disc or ring. The guide, which can be either in a fixed position or movable relative to the movable disc, ensures that the slaughtered animals or parts thereof cannot leave the slit at the position of the guide, despite forces on the slaughtered animals or parts thereof directed in the lengthwise direction of the slit, such as centrifugal forces.

The slits are preferably straight or curved, the width of the slits being possibly adjustable.

The device according to the invention above all provides great flexibility in selective receiving and releasing of slaughtered animals or parts thereof. To this end, in a preferred embodiment feed control means are provided for controlling the feed means on the basis of data fed to the feed control means, such as weight, shape, size and the like, relating to slaughtered animals or parts thereof to be received, and on the basis of data stored in the feed control means, such as the slit and the position in the slit of certain slaughtered animals or certain parts thereof, relating to slaughtered animals or parts thereof situated in the slits of the conveyance means. In addition to or integrated with the above control means, provision can be made for discharge control means for controlling the discharge means on the basis of data fed to the discharge control means, relating to slaughtered animals or parts thereof to be discharged, and on the basis of data stored in the discharge control means, relating to slaughtered animals or parts thereof situated in the slits of the conveyance means.

The conveyance means can move at a fixed speed and can therefore be in a fixed relationship as regards time with a conveyor interacting with the device, but it is also possible to vary both the speed and the direction of movement of the conveyance means selectively, in order to take a particular slit to a particular point at a particular moment. For that purpose, in the first place first conveyance control means for taking the feed end of a predetermined slit into the receiving position can be provided, the slit being determined on the basis of data fed to the first conveyance control means, such as weight, shape, size and the like, relating to slaughtered animals or parts thereof, and provision can be made for second conveyance control means which can be integrated with the first conveyance control means, for taking one end of a predetermined slit into the releasing position, the slit being determined on the basis of data fed to the second conveyance control means, relating to slaughtered animals or parts thereof to be released. Both the first and the second conveyance control means will work on the basis of data stored in said control means, such as the slit and the position in the slit, relating to slaughtered animals or parts thereof situated in the slits of the conveyance means.

In a preferred embodiment, the feed means are adapted to interact with a conveyor in which the slaughtered animals or parts thereof are moved one by one according to a predetermined path past the first point, the feed means comprising a switch mechanism which can be taken into a first position, in which the slaughtered animal or part thereof is not removed from the conveyor, and, synchronized with the conveyor, can be taken into a second position, in which the slaughtered animal or part thereof is removed from the conveyor and fed to one of the slits of the conveyance means. The discharge means can also be equipped to interact with a conveyor in which the slaughtered animals or parts thereof are moved according to a predetermined path from the second point, the discharge means comprising an ejection mechanism which can be taken into a first position, in which the slaughtered animals or parts thereof are not removed from the conveyance means, and, synchronized with the conveyance means, can be taken into a second position, in which the slaughtered animals or parts thereof are removed from the conveyance means, one by one or several at a time, and fed to the conveyor.

The ejection mechanism preferably contains at least two movable guides which can move the slaughtered animals or parts thereof, one by one or several at a time, in the lengthwise direction of each slit. In this case one of the guides can form a stop along which a slaughtered animal or a part thereof is moved into a releasing position, while the other guide is disposed resiliently and presses the one or more slaughtered animals or parts thereof against the first guide.

The discharge means advantageously comprise at least one stationary waiting slit, in which the ejection mechanism places the slaughtered animals or parts thereof removed from the conveyance means in the second position thereof. The discharge means are provided here with an infeed mechanism which can be taken into a first position, in which the slaughtered animals or parts thereof remain in their waiting slit and, synchronized with the conveyor, can be taken into a second position, in which the slaughtered animals or parts thereof are fed into the conveyor from the waiting slit.

In a preferred embodiment of the device of the invention, suitable in particular for high processing speeds, the feed means or the discharge means comprise a mechanical drive in which a control arm hingedly connected to a frame at one end, is driven by an articulated arm mechanism comprising a first arm, one end of which is hingedly connected to the frame, and a second arm, one end of which is hingedly connected to the other end of the first arm, while the other end is hingedly connected to the control arm, the articulated arm mechanism being connected to an actuator, so that with a single stroke of the actuator a to and fro movement of the control arm is carried out. With such a drive, the control arm makes a to and fro swinging movement both during the outward movement of the actuator and during the return movement of the actuator, so that very rapid control operations can be achieved in a simple manner. The actuator can comprise a pneumatically, hydraulically or electrically driven jack, but it can also be in the form of, for example, a crank mechanism.

The claims and advantages will be more readily appreciated as the same becomes better understood by reference to the following detailed description and considered in connection with the accompanying drawings in which like reference symbols designate like parts or parts with a similar function.

BRIEF DESCRIPTION OF THE DRAWINGS

FIG. 15 shows a diagrammatic top view of a conveyance means according to the invention, in the form of a flat ring;

FIG. 16 shows in top view a slit which is adjustable in width, provided in a conveyance means;

FIG. 17 shows in perspective another slit which is adjustable in width, provided in a conveyance means;

DESCRIPTION OF THE PREFERRED EMBODIMENTS

Figure 1:
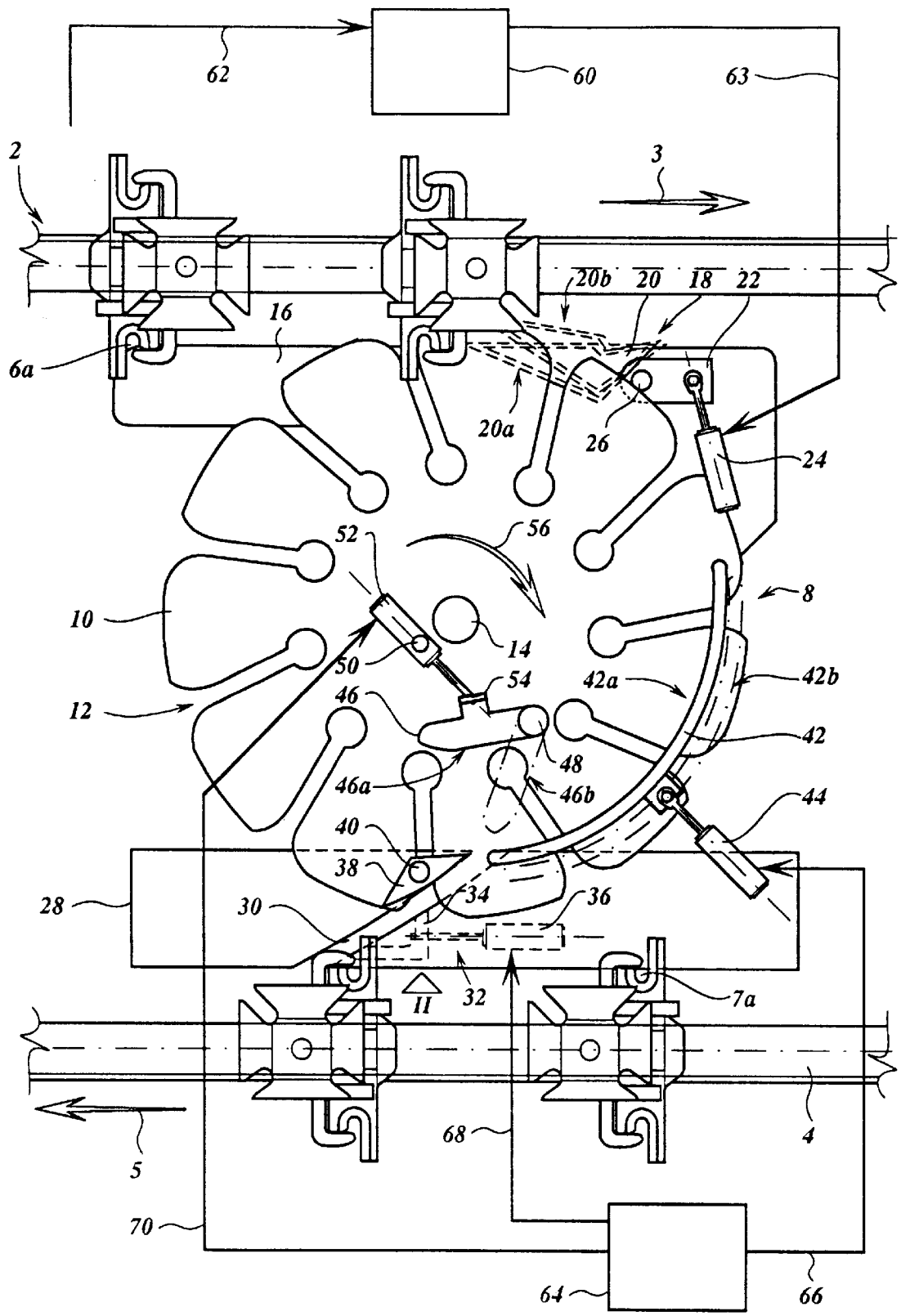
FIG. 1 shows a partially diagrammatic top view of a conveyor device according to the invention, which interacts with a feed conveyor and a discharge conveyor.

FIG. 1 shows a first conveyor 2 and a second conveyor 4, in which rotatable hooks of the type described in the international patent application WO-A-93/13671 are interconnected by means of a chain, and are moved along in the direction indicated by arrows 3 and 5 respectively. It is assumed below that at least some of the conveyor hooks of the conveyor 2 are conveying a leg of a bird at least in conveyance aperture 6a thereof. Such legs can be transferred selectively by means of the conveyor device indicated in its entirety by reference numeral 8 to a conveyance aperture 7a of a conveyance hook of the conveyor 4. It should be pointed out here that the application area of the conveyor device according to the invention is not limited to legs of poultry, but can also comprise the conveyance of other parts of poultry or of other slaughtered animals, or even of whole slaughtered animals where the dimensions of the conveyor device are suitably chosen.

The conveyor device 8 comprises a disc 10, which is provided with a number of slits 12 (eleven slits in the case shown) which at the circumferential side of the disc 10 are open and are provided with a widened feed end, and at the other end run into a circular opening with a greater diameter than the width of the slit 12. The disc is rotatable about a shaft 14, which is mounted in a frame (not shown in any further detail).

At the side of the conveyor 2, by means of which legs can be fed to one of the slits 12 of the disc 10, a guide plate 16 is disposed in the frame, along the edge of which guide plate the conveyance aperture 6a of a conveyance hook of the conveyor 2 can move. Below the disc 10, a switch mechanism 18 is fixed in the frame in a manner not shown in any further detail. The switch mechanism 18 comprises a substantially triangular switch plate 20 which is connected to an arm 22 which by means of a cylinder/piston unit 24 can pivot about a shaft 26 in such a way that the plate 20 can assume various positions, a first position 20a being shown by dashed lines, and a second position 20b being shown by dashed and dotted lines.

Near the conveyor 4, a guide plate 28 is fitted in the frame, which guide plate is provided with a through-going waiting slit 30. The guide plate 28 is situated below an edge part of the disc 10. An infeed mechanism 32 is fitted in the frame below the guide plate 28, said infeed mechanism comprising a substantially L-shaped infeed element 34 which can be moved by a cylinder/piston unit 36 connected thereto in the lengthwise direction of said unit. Situated above the disc 10 is a guide block 38, which is in a fixed position and is fixed in the frame of the conveyor device by means of a rod 40. A curved guide rod 42 is also situated above the disc 10, which guide rod can be moved by means of a piston/cylinder unit 44 fixed to the frame, from the position 42a shown by solid lines to the position 42b indicated by dashed and dotted lines, and vice versa. The guide rod 42 forms part of the ejection mechanism of the conveyor device 8. Another part of the ejection mechanism consists of a guide arm 46 which can pivot relative to a shaft 48 between the position 46a indicated by solid lines and the position 46b shown by dashed and dotted lines, by means of a cylinder/piston unit 52 which can pivot about an axis 50, and the piston rod of which is connected by means of a flexible coupling 54 to the guide arm 46. The cylinder/piston unit 52 acts as an air spring.

The slits 12 of the disc 10 are of such length that at least three legs of poultry can be received therein. The leg supplied in the conveyance aperture 6a of a conveyance hook of the conveyor 2 is received by placing the switch plate 20 in position 20b. The conveyance hook of the conveyor 2 is, of course, opened here, so that the leg can leave the conveyance aperture 6a of the conveyance hook and by way of a slit 12 is pressed through the feed end thereof when the disc 10 is moved in the direction of arrow 56. With continued rotation of the disc 10, during which the guide rod 42 is in the position 42*a* and the guide arm 46 is in the position 46*a*, the leg will then remain in its slit. If more legs are being taken into a slit 12 than the latter can contain, the leg first taken into the slit 12 falls out of the disc 10 through the circular opening at the innermost end of the slit, for example into a collection bin or onto a conveyor belt.

As shown symbolically by arrow 63, the switch mechanism 18 is controlled by feed control means which are indicated diagrammatically by 60, and to which data relating to legs to be received are fed, as shown symbolically by arrow 62. The feed control means can also contain data relating to slaughtered animals or parts thereof situated in the slits of the conveyance means, in order to make a particular leg which has been supplied in the conveyor 2 go into a particular slit 12 which is still free or, for example, into another slit which already has legs with the same characteristics as those to be added thereto.

At the discharge side of the conveyor device, the control for discharging legs from the slits of the disc 10 is carried out by discharge control means which are indicated diagrammatically by 64. The discharge control means 64 control the position of the guide rad 42, as indicated diagrammatically by arrow 66, the position of the infeed element 34, as indicated diagrammatically by arrow 68, and the position of the guide arm 46, as indicated diagrammatically by arrow 70. In addition, the discharge control means 64 can contain data relating to slaughtered animals or parts thereof situated in the slits of the conveyance means, so that legs can be discharged selectively from a predetermined slit 12 to the conveyor 4. The way in which this is carried out will be explained further below with reference to FIGS. 2–10.

Figure 1A:
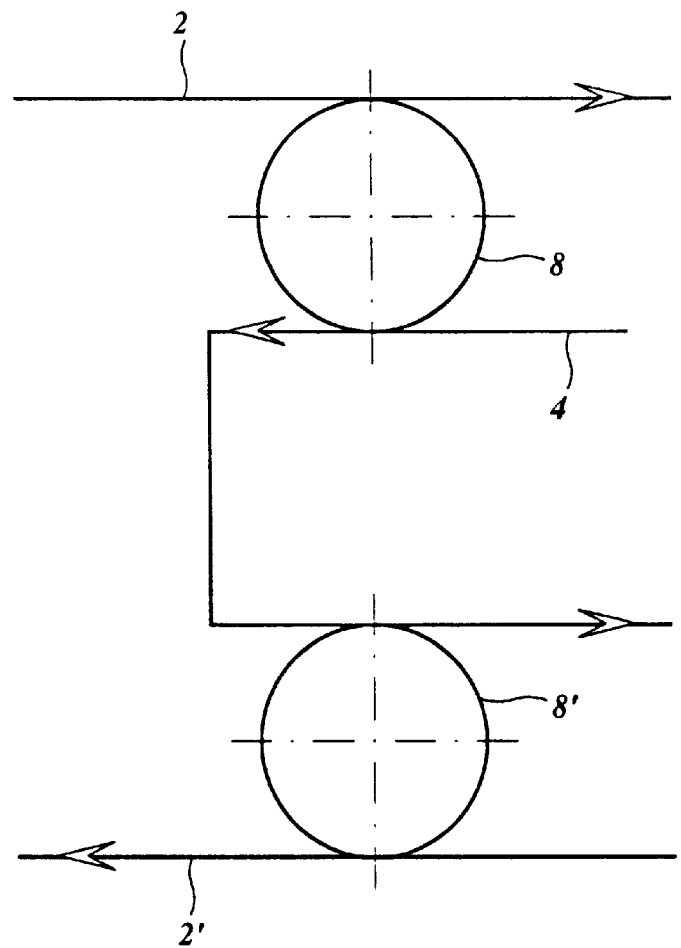
FIG. 1a is a very diagrammatic illustration of two arrangements according to FIG. 1 in a certain configuration.

FIG. 1*a* shows a feed conveyor 2, from which slaughtered animals or parts thereof are transferred selectively by means of a conveyance means 8 to a discharge conveyor 4. Slaughtered animals or parts thereof are also transferred selectively from a second feed conveyor 2' by means of conveyance means 8' to the discharge conveyor.

Figure 1B:
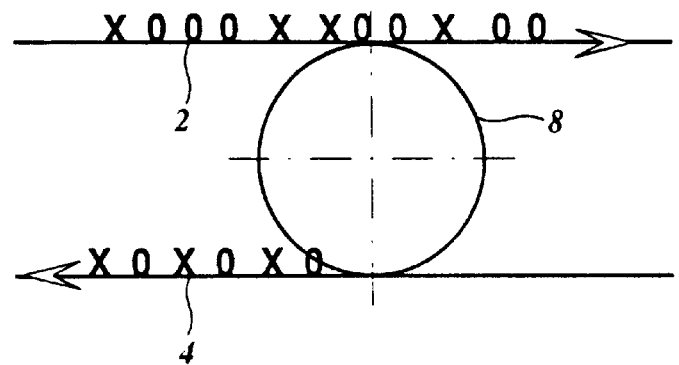
FIG. 1b illustrates very diagrammatically a particular sorting operation carried out with the arrangement according to FIG. 1.

FIG. 1*b* shows a feed conveyor 2 in which various slaughtered animals or parts thereof, indicated here by "X" and "O", are being conveyed. By a selective transfer of the slaughtered animals or parts thereof "X" and "O" to a discharge conveyor 4 by means of a conveyance means 8, a predetermined sequence of "X" and "O" can be obtained in the discharge conveyor 4, for example legs of birds of a particular weight alternately.

Figure 2:
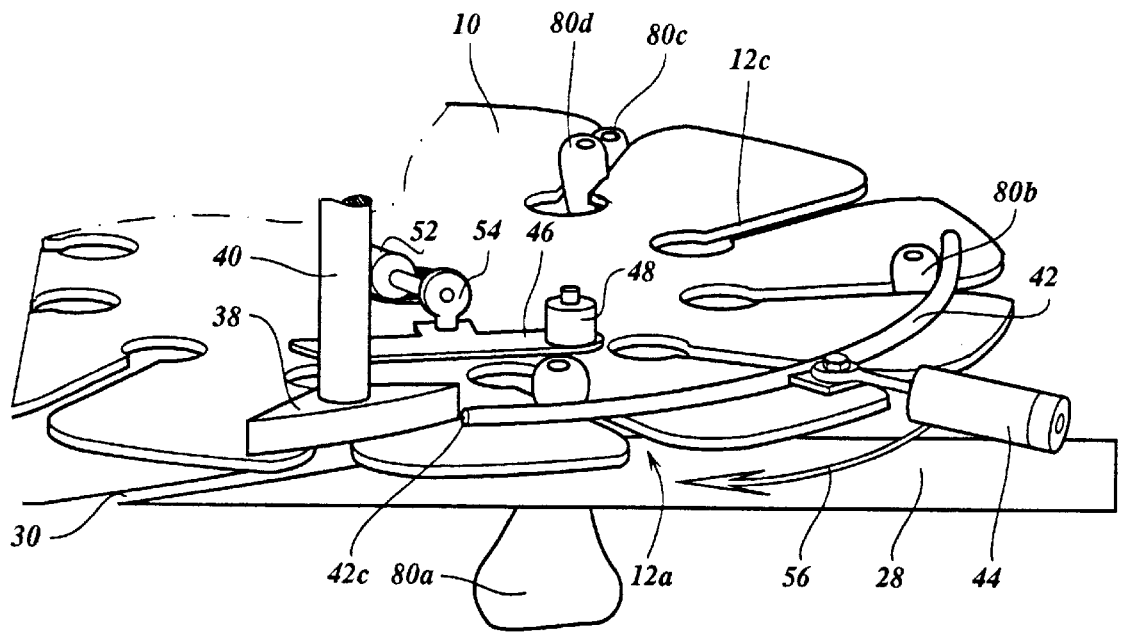
FIG. 2 shows a first perspective view of a part of the conveyor device according to FIG. 1, viewed from the direction of arrow II.

FIG. 2 shows a part of the disc 10, with a leg accommodated in some slits. Slit 12*a* contains leg 80*a*, slit 12*b* contains leg 80*b*, and slit 12*c* contains legs 80*c* and 80*d*. The disc 10 rotates in the direction of the arrow 56. The guide rod 42 is in the position 42*a* thereof, and the guide arm 46 is in the position 46*a* thereof. As a result of this, after the leg 80*a* has moved past the end 42*c* of the guide rod 42, said leg ultimately reaches the side of the guide block 38 facing the centre of the disc 10; the leg 80 therefore follows a circular path in the slit 12*a* of the disc 10.

Figure 3:
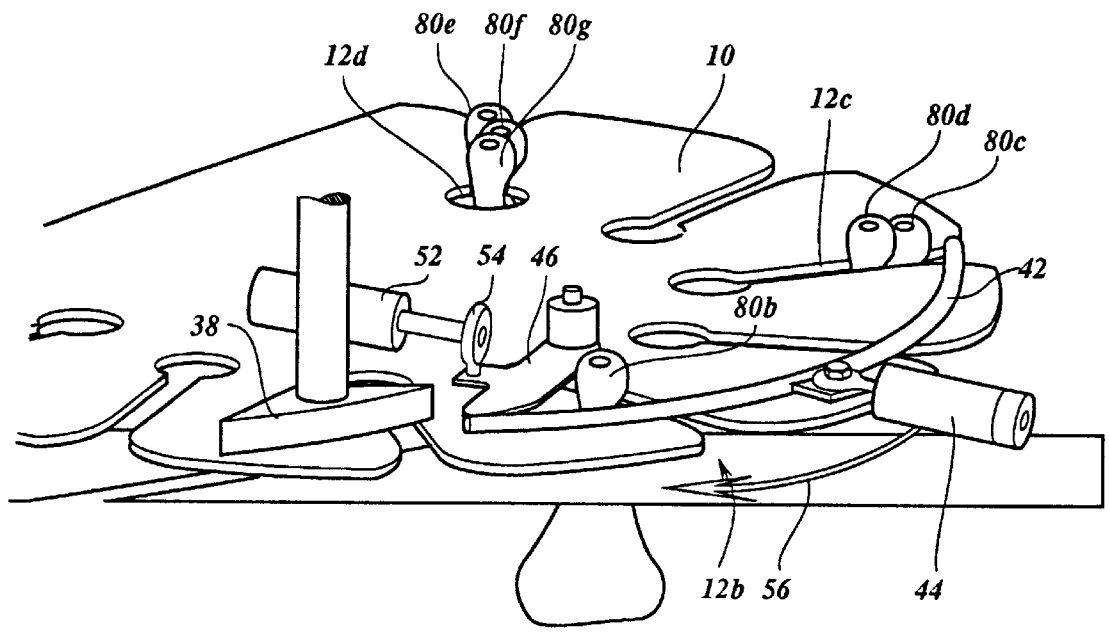
FIGS. 3–10 show other perspective views of the conveyor device according to FIG. 1, viewed from the direction indicated by arrow II, which figures illustrate different conveyance possibilities of the conveyor device.
Figure 4:
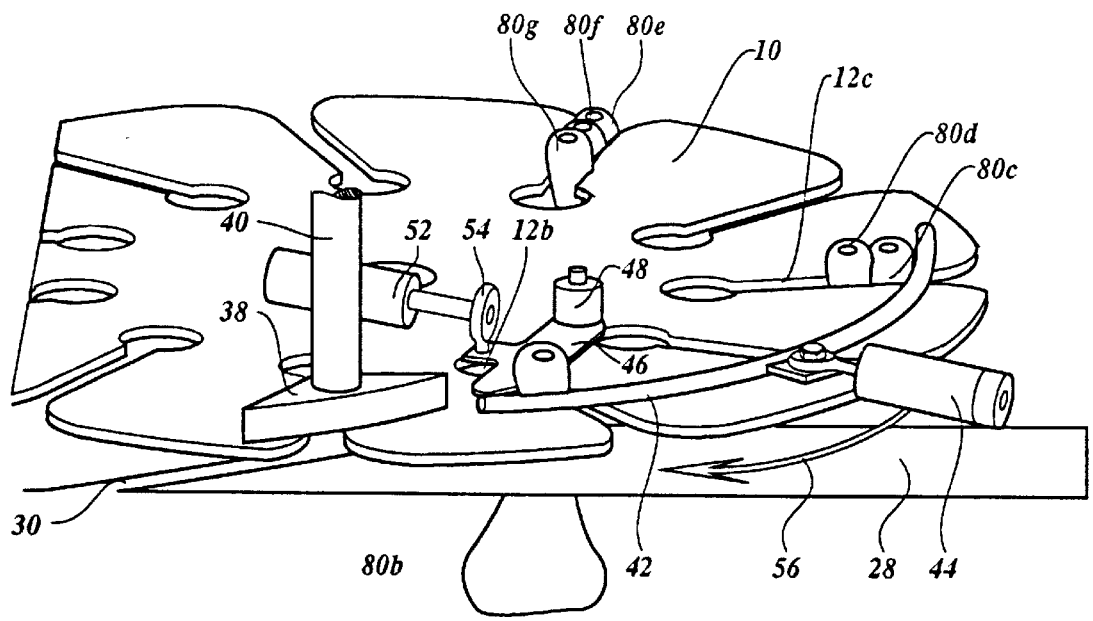

Leg 80*b* then has to be removed from slit 12*b*, for which purpose guide rod 42 is moved by means of cylinder/piston unit 44 to its position 42*b*, and the guide arm 46 is moved by means of cylinder/piston unit 52 to its position 46*b*. This situation is shown in FIG. 3. The resilient guide arm 46 guides the leg 80*b* in the slit 12*b* in the direction of the outer circumference of the disc 10, so that the leg is pressed against the guide 42. This situation is shown in FIG. 4. Both in FIG. 3 and in the following figures, parts of legs 80*e*, 80*f* and 80*g* can be seen in a slit 12*d*.

Figure 5:
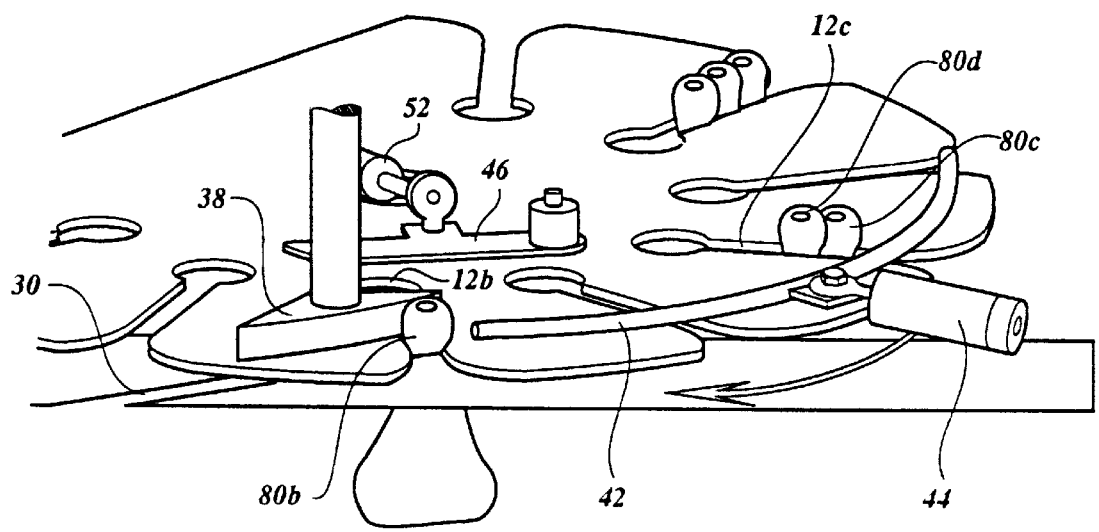

If the disc is rotated further in the direction of the arrow 56, the leg 80*b* ultimately reaches the waiting slit 32 at the side of the guide block 38 facing away from the centre of the disc 10. This situation is shown in FIG. 5, in which it can also be seen that the guide rod 42 and the guide arm 46 resume their positions 42*a* and 46*a* respectively shown in FIG. 2.

Figure 6:
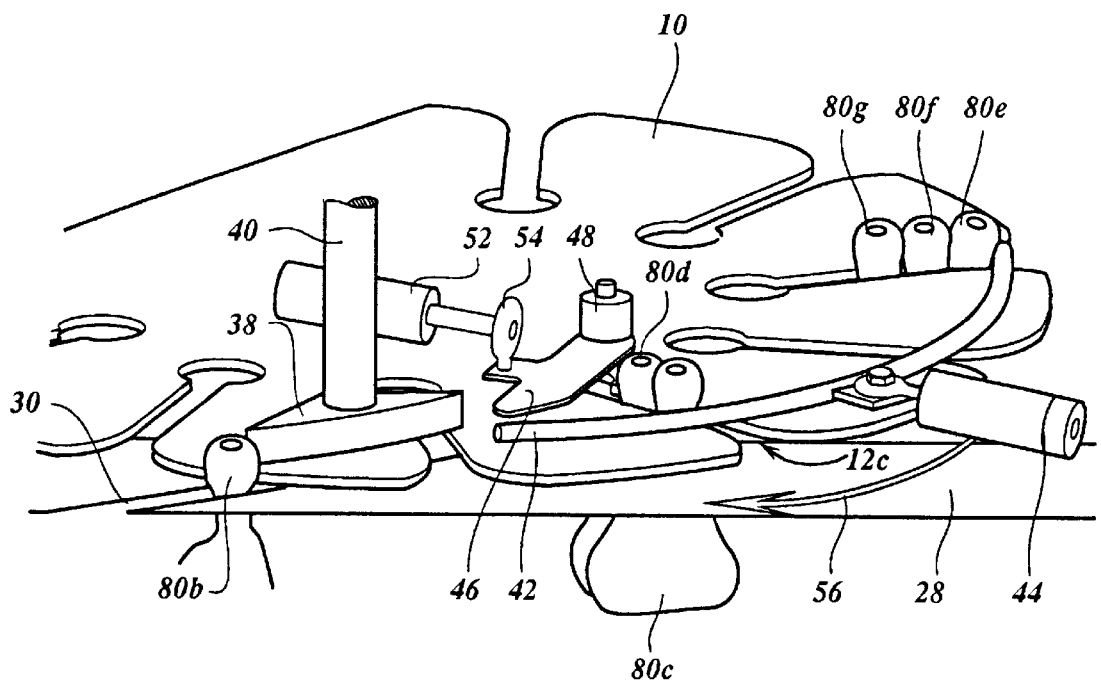
Figure 7:
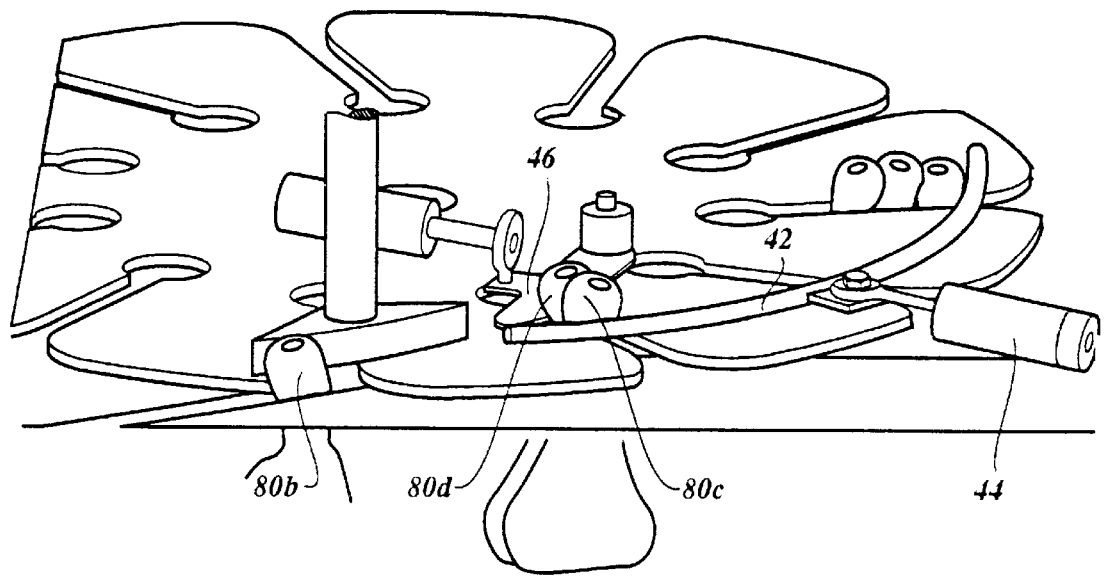

When the legs 80*c* and 80*d* in slit 12*c* approach the end 42*c* of the guide rod 42 by rotation of the disc 10 in the direction of the arrow 56, the guide rod 42 and the guide arm 46 are returned to their position 42*b* and 46*b* respectively. This situation is shown in FIG. 6. As FIG. 7 then shows, the resiliently disposed guide arm 46 presses the two legs in the slit 12*c* in the direction of the guide 42 until the leg 80*c* touches said guide.

Figure 8:
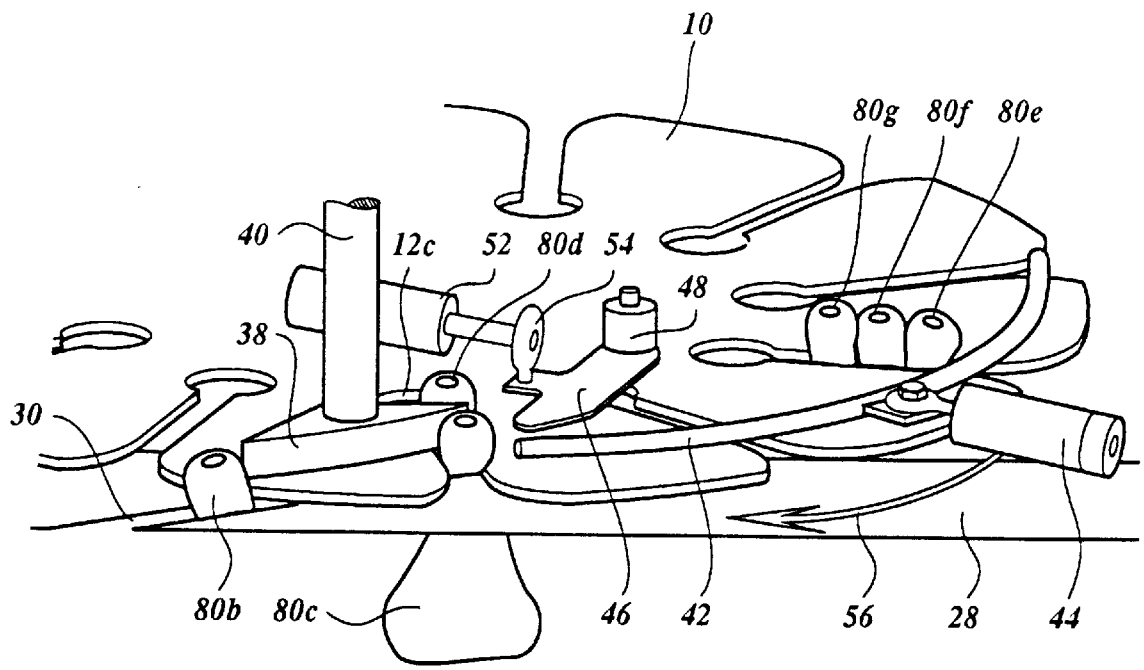

As FIG. 8 illustrates, the guide block 38 then makes the leg 80*c* and the leg 80*d* go on either side of the guide block 38, in which case the leg 80*c* is guided into the waiting slit 30, and the leg 80*d* remains in the slit 12*c* of the disc 10.

Figure 9:
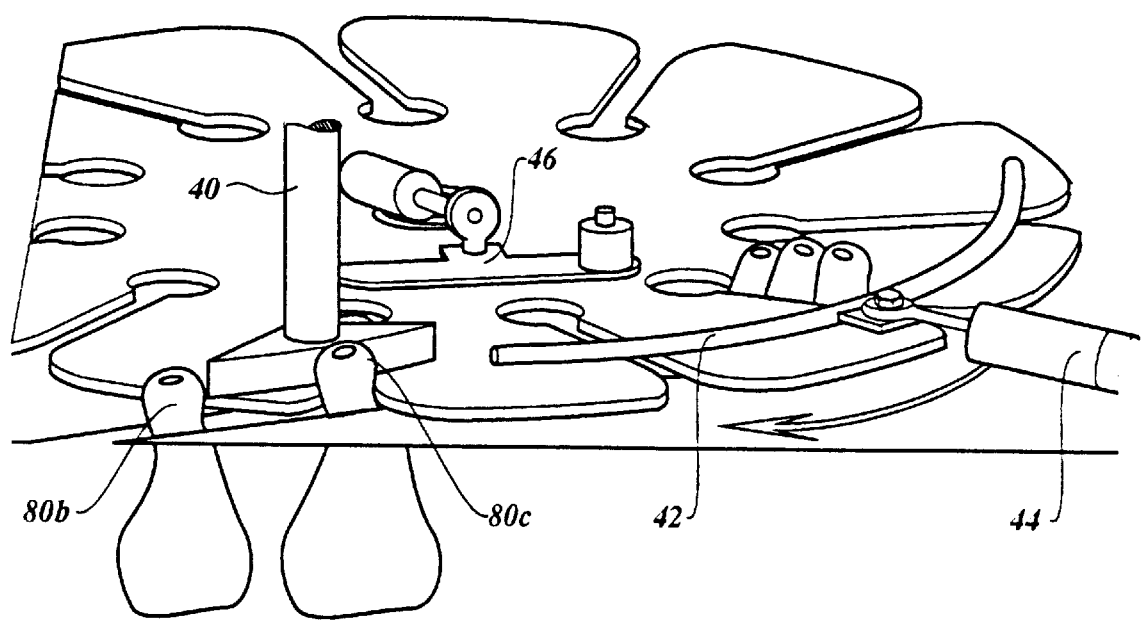
Figure 10:
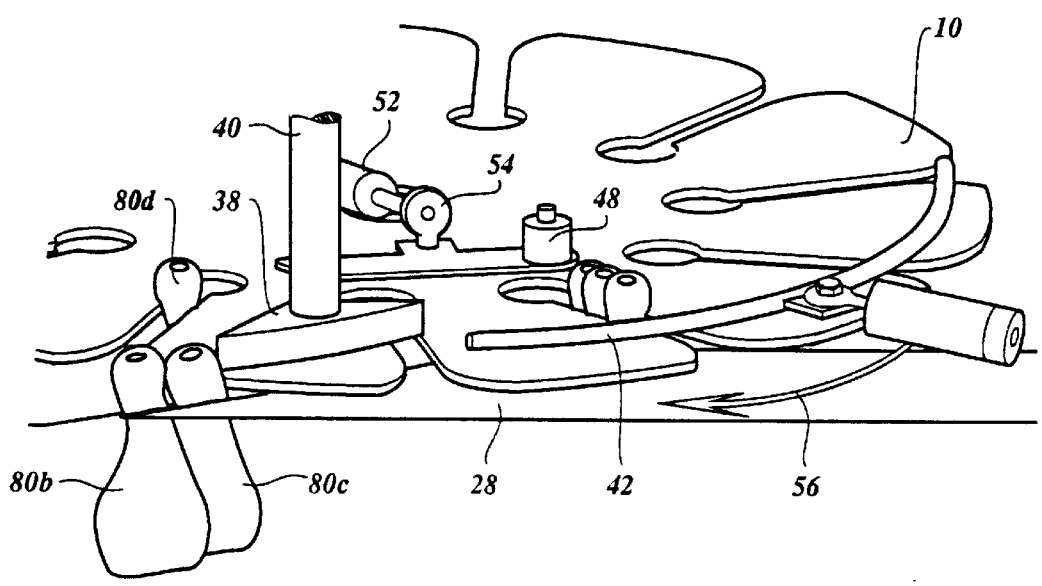

FIGS. 9 and 10 illustrate the positions of the legs 80*b*–80*g* when further rotation of the disc occurs in the direction of the arrow 56. It will be clear that legs can be removed selectively from the slits 12 of the disc 10 in this way and placed in waiting slit 30*b*, from where they can be taken in a manner not shown in any further detail by means of an infeed element 34 into a conveyance aperture of a conveyance hook of the conveyor 4.

Figure 11:
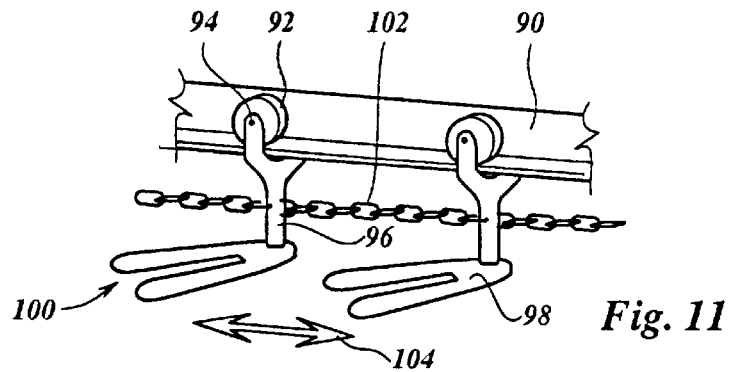
FIG. 11 shows a perspective view of a first alternative embodiment of a conveyance means of a conveyor device according to the invention.

FIG. 11 shows a part of a conveyance means in the form of an overhead conveyor track with a number of trolleys. The conveyor consists of a rail 90 with a substantially inverted T-shaped cross-section. Resting on the laterally projecting flanges of the rail 90 are wheels 92 which are connected, in such a way that they can rotate freely about a shaft 94, to a forked part 96, bearing at the bottom end a substantially horizontally directed U-shaped element 98 with a slit 100. The forked parts 96 are interconnected by a chain 102 and are thus movable along the rail 90 in the directions indicated by double arrow 104.

Figure 12:
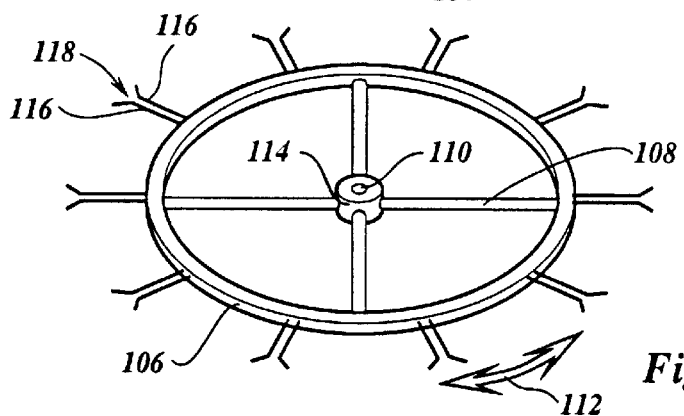
FIG. 12 shows a perspective view of a second alternative embodiment of a conveyance means of a conveyor device according to the invention.

FIG. 12 shows a conveyance means in the form of a ring 106 which extends substantially in a horizontal plane and is connected by means of spokes 108 to a hub 114 rotatable about a shaft 110 in directions indicated by double arrow 112. The ring 106 bears along its outer circumference pairs of rods 116, the free ends of which are bent away from each other, and which define slits 118.

Figure 13:
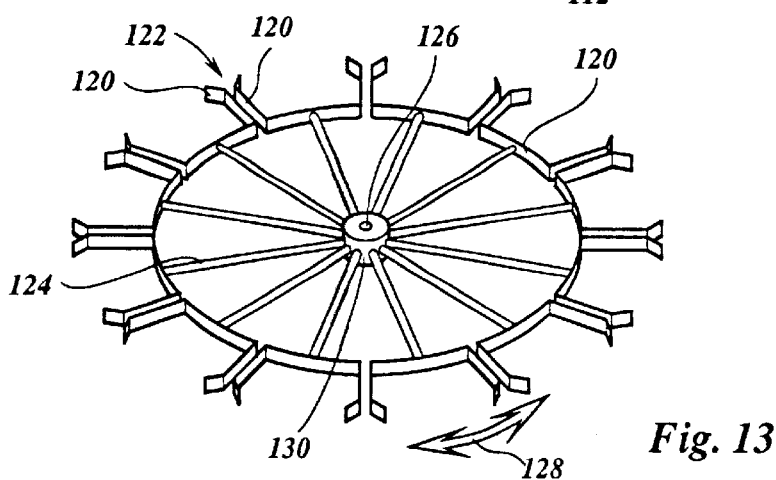
FIG. 13 shows a perspective view of a third alternative embodiment of a conveyance means of a conveyor device according to the invention.

In the conveyance means shown in FIG. 13 the slits 122, formed by strips 120 bent into a substantially U-shape, are open at both their ends, so that a slaughtered animal or part thereof can be pushed out of the slit or taken into the slit at both ends, unlike the slits according to FIG. 12, which are closed at the end near the ring 106, and to which/from which a slaughtered animal or part thereof can be supplied or discharged solely at the end facing away from the ring 106. In FIG. 13 each strip 120 is fixed to a spoke 124, which in turn is connected to a hub 130 which is rotatable about a shaft 126 in directions indicated by double arrow 128.

Figure 14:
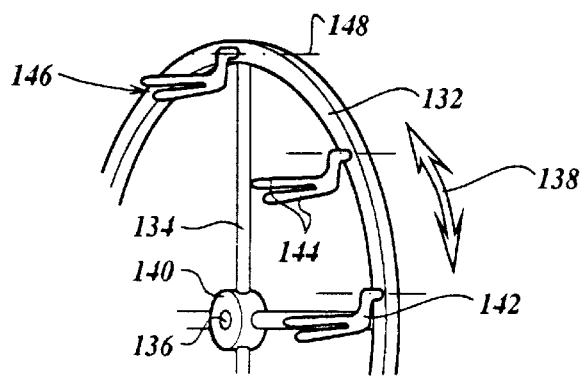
FIG. 14 shows a partial perspective view of a fourth alternative embodiment of a conveyance means of a conveyor device according to the invention.

FIG. 14 shows a conveyance means in the form of a ring 132 which is disposed in a substantially vertical plane and is connected by means of spokes 134 to a hub 140 which is rotatable about a shaft 136 in directions indicated by double arrow 138. The ring 132 bears elements 142, legs 144 of which define a slit 146. The elements 142 are connected to the ring 132 in such a way that they are freely rotatable about an axis 148 and have a centre of gravity lying below the axis of rotation 148, so that, irrespective of the position on the ring and irrespective of the movement of the ring, the orientation of each element 142 is always the same, owing to the effect of gravity.

FIG. 15 shows a flat ring 150, which is constructed of a number of segments 152, in this case six segments. The segments 152 are fixed relative to each other by means of a supporting structure (not shown in any further detail) in such a way that curved slits 154 are defined between them. The slits have an axis which at both ends thereof is directed at an angle to a radial line from each of the ends towards the centre point of the ring. The ring can fulfil the same function as the disc 10 according to FIGS. 1–10 or the conveyance means shown in FIG. 13.

FIG. 16 shows a part of a conveyance means, such as the conveyance means 10 of FIGS. 1–10, which conveyance means is provided with a slit 12. Provision is made on the conveyance means for adjusting the width of the slit 12 by fixing a strip 158 provided with slotted holes 156 on a longitudinal side thereof by means of screws 160. The strip 158 can be moved in the lengthwise direction of the slotted holes 156 for varying the width of the slit 12. The slit width can thus be adapted in a simple manner to the local dimensions of the slaughtered animals or parts thereof to be supported in a bearing manner in the slit 12.

FIG. 17 illustrates another way of varying the effective width of a slit 161 of a conveyance means. The conveyance means 162 according to FIG. 17 is constructed of two substantially identical elements 162a and 162b, it being possible to slide the one element relative to the other element in the directions indicated by double arrow 164 and to fix it in a specific position relative to the other element. A desired slit width can again be set rapidly and easily in this way, possibly for several slits simultaneously if the elements 162a and 162b are provided with several slits 161.

Figure 18:
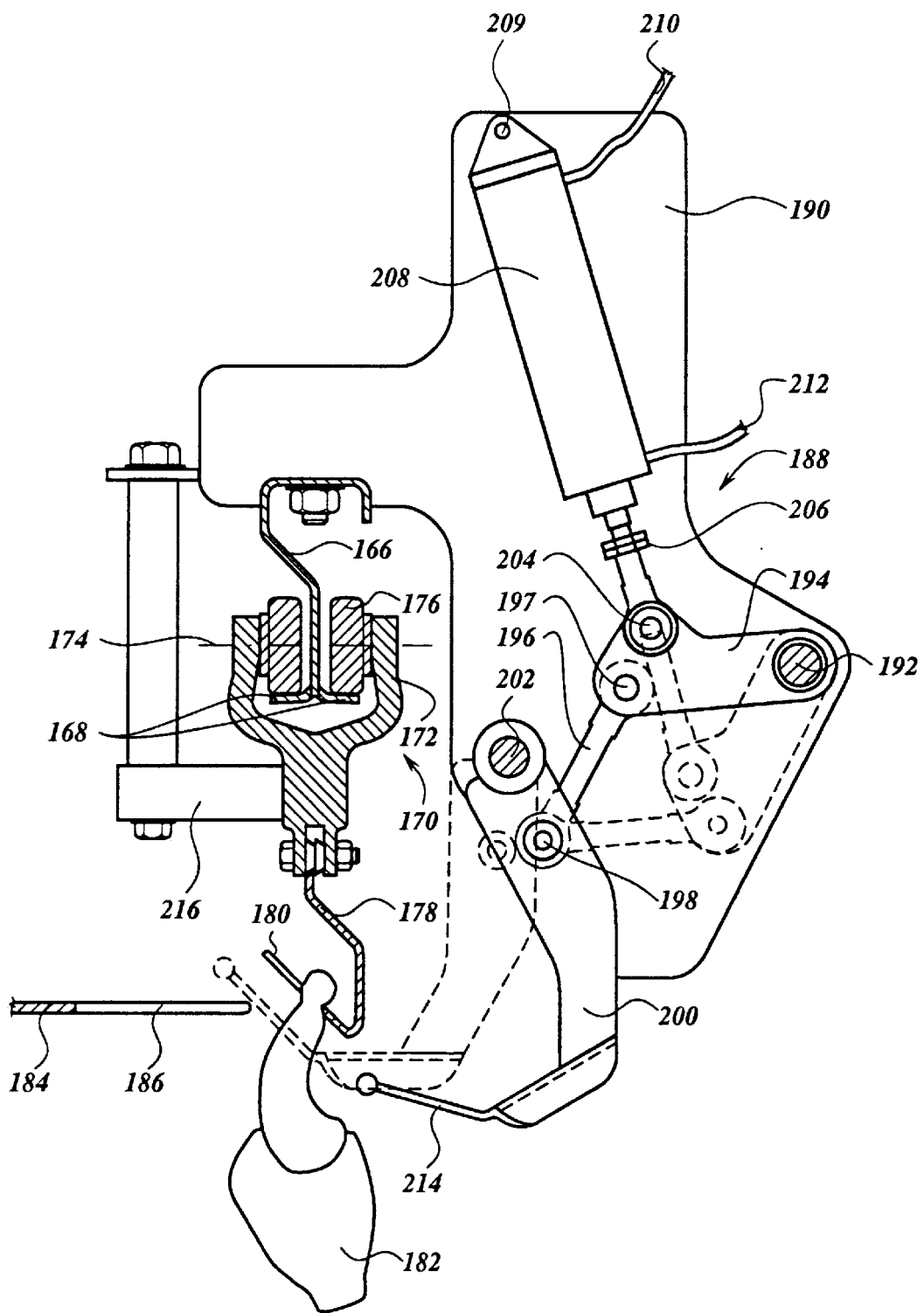
FIG. 18 illustrates a mechanical drive with articulated arm mechanism, for discharging poultry from and feeding it to a conveyance means.

FIG. 18 shows a part of an overhead conveyor track, comprising a section 166 which defines the track, along two flanges 168 of which trolleys 170 can be moved. The trolleys 170 comprise a substantially Y-shaped member 172, on the ends of the legs of which runners 176, which are rotatable about an axis 174 and rest on the flanges 168, are fitted. The trolley 170 bears a hook 178 which is provided with two substantially parallel slits 180 for receiving the legs of slaughtered poultry 182 near the ankle joints. The overhead conveyor track, which in itself can form the conveyance means of the conveyor device according to the invention, is moved along an only diagrammatically indicated conveyance means 184 which is provided with slits 186. The movements of the trolleys 170 and the conveyance means 184 are synchronized in such a way that a slit 186 is situated opposite each slit 180 in the period of time during which the hook 178 is passing the conveyance means 184. Disposed at the position of conveyance means 184 is an unloading device 188, comprising a frame 190 which, in a manner not shown in any further detail, is connected to the section 166. One end of a first arm 194 is fixed on the frame 190 in such a way that it is pivotable about a shaft 192, to which arm one end of a second arm 196 is connected, near the other end of the first arm 194, in such a way that it is pivotable about a shaft 197. The other end of the second arm 196 is connected, in such a way that it is pivotable about a shaft 198, to a control arm 200, which at one end thereof is connected to the frame 190 in such a way that it is pivotable about a shaft 202. The abovementioned other end of the first arm 194 is also connected to the driving rod 206—in such a way that it is pivotable about a shaft 204—of a cylinder/piston unit 208, which is preferably driven by means of compressed air by way of the lines 210 and 212. The end of the cylinder/piston unit 208 facing away from the driving rod end is connected to the frame 190 in such a way that it is pivotable about a shaft 209.

When compressed air is fed in by way of the line 210 to the cylinder/piston unit 208, the driving rod 206 will be thrust out, so that the first arm 194 and the second arm 196 will pivot from the position indicated by solid lines to the position indicated by dashed lines. In this case the control arm 200 will move from the position indicated by solid lines by way of the position indicated by dashed lines back to the position indicated by solid lines. In other words, during the outward stroke of the driving rod 206 the control arm 200 moves to and fro. It is easy to understand that the control arm 200 will move to and fro again during the return stroke of the driving rod 206. On account of the articulated arm mechanism 194, 196, the control arm can therefore be moved to and fro at double the speed of the to and fro movement of the driving rod 206. During the to and fro movement of the control arm 200 a thrust plate 214 connected to the control arm 200 presses the legs of the poultry 182 out of the slits 180 and into the slits 186. Poultry can thus be transferred selectively from the overhead conveyor track to the conveyance means 184.

In order to prevent the trolley 170 from tilting while the poultry 182 is being pushed out of the hook, a stop 216 is connected to the frame 190, which stop retains the trolley 170.

The use of the articulated arm mechanism and the rapid execution of a to and fro movement of a control arm 200 obtained therewith is not limited to the use shown in FIG. 18 of selectively transferring a slaughtered animal or a part thereof from a first to a second conveyor. This can involve, for example, the transfer of slaughtered animals or parts thereof from a first conveyor with a first type of hook to a second conveyor with a second type of hook, since different hooks can be used in the different slaughter stages: a slaughter hook for operations up to and including evisceration of the slaughtered animals, a cooling hook for use in a cooling device, a weighing hook for weighing the slaughtered animal or a part thereof, or a parts hook for use in processing the slaughtered animal or a part thereof into parts.

The drive described with reference to FIG. 18 can also be used in an adapted form, for example, for replacement of the cylinder/piston unit 52 according to FIGS. 1–10. Another use is selective ejection of slaughtered animals or parts thereof, for example into an unloading station or for sorting the slaughtered animals or parts thereof in a packing station.

While the invention has been described and illustrated in its preferred embodiments, it should be understood that departures may be made therefrom within the scope of the invention, which is not limited to the details disclosed herein.

What is claimed is:

1. A conveyor device for receiving slaughtered animals or parts thereof at a first point and selectively releasing said slaughtered animals or parts thereof at a second point, the device comprising:

a movable, endless conveyance means having a conveyance path along which said first and second points are situated, and being provided with a number of slits each being equipped for supporting in a bearing manner therein at least one of said slaughtered animals or parts thereof;

feed means for feeding said at least one slaughtered animal or part thereof at said first point to one of said slits of said conveyance means, in a receiving position of said conveyance means;

discharge means for discharging said at least one slaughtered animal or part thereof at said second point from said one of said slits of said conveyance means, in a releasing position of said conveyance means; and discharge control means for controlling said discharge means for selectively discharging said at least one slaughtered animal or part thereof on the basis of data relating to said at least one slaughtered animal or part thereof to be discharged.

2. The device of claim 1, wherein said slits extend substantially in a horizontal plane.

3. The device of claim 1, wherein one or more of said slits comprise a widened part in which the slaughtered animal or part thereof cannot be supported.

4. The device of claim 3, wherein said widened parts of said slits coincide and consist of an opening connecting to ends of said slits.

5. The device of claim 1, wherein said conveyance means is formed by a rotatably driven disc or flat ring which is provided with the slits along the outer circumference, or inner or outer circumference thereof respectively.

6. The device of claim 5, wherein the axis of said slits at one end thereof is directed at an acute angle to the radial line from said end to the centre point of said disc or ring.

7. The device of claim 6, wherein said angle is about 5–35°.

8. The device of claim 1, wherein said conveyance means is formed by a conveyor with a number of carriers to be moved along, each bearing an element with one or more slits.

9. The device of claim 8, wherein the axis of said slits at one end thereof is directed at an acute or a right angle to the direction of movement of said carriers.

10. The device of claim 1, wherein said conveyance means is formed by a rotatably driven ring bearing one or more elements which each define said one or more slits.

11. The device of claim 10, wherein said ring extends substantially in a horizontal plane.

12. The device of claim 10, wherein said ring extends substantially in a vertical plane.

13. The device of claim 5 or 10, wherein a circle segment-shaped guide is fitted near one end of said slits, substantially parallel to the outer circumference of said disc or ring.

14. The device of claim 1, wherein said slits are straight or curved.

15. The device of claim 1, wherein the width of said slits is adjustable.

16. The conveyor device of claim 1, comprising first conveyance control means for controlling said conveyance means for moving said conveyance means to said receiving position on the basis of data relating to said at least one slaughtered animal or part thereof to be received.

17. The device of claim 16, wherein said first conveyance control means are adapted for controlling said conveyance means on the basis of data stored in said first conveyance control means, relating to at least one slaughtered animal or part thereof situated in one of said slits of said conveyance means.

18. The device of claim 1, wherein first conveyance control means for taking the feed end of a predetermined one of said slits into the receiving position are provided, the slit being determined on the basis of data fed to first conveyance control means, relating to slaughtered animals or parts thereof, and on the basis of data stored in said first conveyance control means, relating to slaughtered animals or parts thereof situated in the slits of said conveyance means.

19. The device of claim 1, wherein provision is made for second conveyance control means, for taking the end of a predetermined slit into the releasing position, the slit being determined on the basis of data fed to second conveyance control means, relating to slaughtered animals or parts thereof to be released, and on the basis of data stored in said second conveyance control means, relating to slaughtered animals or parts thereof situated in the slits of said conveyance means.

20. The device of claim 1, wherein said feed means are adapted to interact with a conveyor in which the slaughtered animals or parts thereof are moved one by one according to a predetermined path past said first point, said feed means comprising a switch mechanism which can be taken into a first position, in which the slaughtered animal or part thereof is not removed from said conveyor, and, synchronized with said conveyor, can be taken into a second position, in which the slaughtered animal or part thereof is removed from said conveyor and fed to one of said slits of said conveyance means.

21. The device of claim 20, wherein said switch mechanism comprises a guide which in said second position of said switch mechanism and from said feed end onwards can exert force directed into said slit on the slaughtered animal or the part thereof.

22. The device of claim 1, wherein said discharge means are equipped to interact with a conveyor in which the slaughtered animals or parts thereof are moved according to a predetermined path from said second point, said discharge means comprising an ejection mechanism which can be taken into a first position in which the slaughtered animals or parts thereof are not removed from said conveyance means, and, synchronized with said conveyance means, can be taken into a second position, in which the slaughtered animals or parts thereof are removed from said conveyance means, one by one or several at a time, and fed to said conveyor.

23. The device of claim 22, wherein said ejection mechanism contains at least two movable guides which can move the slaughtered animals or parts thereof, one by one or several at a time, in the lengthwise direction of each slit.

24. The device of claim 22, wherein said discharge means comprise at least one stationary waiting slit, in which said ejection mechanism places the slaughtered animals or parts thereof removed from said conveyance means in said second position thereof.

25. The device of claim 24, wherein said discharge means comprise an infeed mechanism which can be taken into a first position, in which the slaughtered animals or parts thereof remain in their waiting slit and, synchronized with said conveyor, can be taken into a second position, in which the slaughtered animals or parts thereof are fed into said conveyor from said waiting slit.

26. The device of claim 1, wherein said feed means or said discharge means comprise a mechanical drive in which a control arm hingedly connected to a frame at one end, is driven by an articulated arm mechanism comprising a first arm, one end of which is hingedly connected to said frame, and a second arm, one end of which is hingedly connected to the other end of the first arm, while said other end is hingedly connected to said control arm, said articulated arm mechanism being connected to an actuator, so that with a single stroke of said actuator a to and fro movement of said control arm is carried out.

27. The conveyor device of claim 1, comprising second conveyance control means for controlling said conveyance means for moving said conveyance means to said releasing position on the basis of data relating to said at least one slaughtered animal or part thereof to be discharged.

28. The device of claim 1, wherein the slits of said conveyance means are each equipped for supporting in a bearing manner therein at least two slaughtered animals or parts thereof.

29. The device of claim 1, comprising feed control means for controlling said feed means for selectively feeding at least one slaughtered animal or part thereof on the basis of data relating to said at least one slaughtered animal or part thereof to be received.

30. The device of claim 29, wherein said feed control means are adapted for controlling said feed means on the basis of data stored in said feed control means, relating to at least one slaughtered animal or part thereof situated in one of said slits of said conveyance means.

31. The device of claim 1, wherein said discharge control means are adapted for controlling said discharge means on the basis of data stored in said discharge control means, relating to at least one slaughtered animal or part thereof situated in one of said slits of said conveyance means.

32. The device of claim 27, wherein said second conveyance control means are adapted for controlling said conveyance means on the basis of data stored in said second conveyance control means, relating to at least one slaughtered animal or part thereof situated in one of said slits of said conveyance means.

33. A conveyor device for receiving slaughtered animals or parts thereof at a first point and releasing slaughtered animals or parts thereof at a second point, comprising:
   a movable, endless conveyance means, along the path of which the first and the second point are situated,
   feed means for feeding the slaughtered animals or parts thereof at the first point to the conveyance means in a receiving position;
   and discharge means for discharging the slaughtered animals or parts thereof from the conveyance means at the second point, in a releasing position, wherein:
      said conveyance means is provided with a number of slits which are open at least at a feed end, and which are each equipped for supporting in a bearing manner therein at least two slaughtered animals or parts thereof;
      said feed means are adapted for feeding the slaughtered animals or parts thereof to the feed end of one of the slits of said conveyance means; and
      said discharge means are adapted for discharging the slaughtered animals or parts thereof from one of the slits of said conveyance means via one end of the slit concerned, wherein said feed means are adapted to interact with a conveyor in which the slaughtered animals or parts thereof are moved one by one according to a predetermined path past said first point, said feed means comprising a switch mechanism which can be taken into a first position, in which the slaughtered animal or part thereof is not removed from said conveyor, and, synchronized with said conveyor, can be taken into a second position, in which the slaughtered animal or part thereof is removed from said conveyor and fed to one of said slits of said conveyance means.

34. The device of claim 33, wherein said switch mechanism comprises a guide which in said second position of said switch mechanism and from said feed end onwards can exert force directed into said slit on the slaughtered animal or the part thereof.

35. A conveyor device for receiving slaughtered animals or parts thereof at a first point and releasing slaughtered animals or parts thereof at a second point, comprising:
   a movable, endless conveyance means, along the path of which the first and the second point are situated,
   feed means for feeding the slaughtered animals or parts thereof at the first point to the conveyance means in a receiving position;
   and discharge means for discharging the slaughtered animals or parts thereof from the conveyance means at the second point, in a releasing position, wherein:
      said conveyance means is provided with a number of slits which are open at least at a feed end, and which are each equipped for supporting in a bearing manner therein at least two slaughtered animals or parts thereof;
      said feed means are adapted for feeding the slaughtered animals or parts thereof to the feed end of one of the slits of said conveyance means; and
      said discharge means are adapted for discharging the slaughtered animals or parts thereof from one of the slits of said conveyance means via one end of the slit concerned, wherein said feed means or said discharge means comprise a mechanical drive in which a control arm hingedly connected to a frame at one end, is driven by an articulated arm mechanism comprising a first arm, one end of which is hingedly connected to said frame, and a second arm, one end of which is hingedly connected to the other end of the first arm, while said other end is hingedly connected to said control arm, said articulated arm mechanism being connected to an actuator, so that with a single stroke of said actuator a to and fro movement of said control arm is carried out.

36. A conveyor device for receiving slaughtered animals or parts thereof at a first point and releasing slaughtered animals or parts thereof at a second point, comprising:
   a movable, endless conveyance means, along the path of which the first and the second point are situated,
   feed means for feeding the slaughtered animals or parts thereof at the first point to the conveyance means in a receiving position;
   and discharge means for discharging the slaughtered animals or parts thereof from the conveyance means at the second point, in a releasing position, wherein:
      said conveyance means is provided with a number of slits which are open at least at a feed end, and which are each equipped for supporting in a bearing manner therein at least two slaughtered animals or parts thereof;
      said feed means are adapted for feeding the slaughtered animals or parts thereof to the feed end of one of the slits of said conveyance means; and
      said discharge means are adapted for discharging the slaughtered animals or parts thereof from one of the slits of said conveyance means via one end of the slit concerned, wherein the width of said slits is adjustable.

37. A conveyor device for receiving slaughtered animals or parts thereof at a first point and releasing slaughtered animals or parts thereof at a second point, comprising:
   a movable, endless conveyance means, along the path of which the first and the second point are situated,
   feed means for feeding the slaughtered animals or parts thereof at the first point to the conveyance means in a receiving position;
   and discharge means for discharging the slaughtered animals or parts thereof from the conveyance means at the second point, in a releasing position, wherein:

said conveyance means is provided with a number of slits which are open at least at a feed end, and which are each equipped for supporting in a bearing manner therein at least two slaughtered animals or parts thereof;

said feed means are adapted for feeding the slaughtered animals or parts thereof to the feed end of one of the slits of said conveyance means; and said discharge means are adapted for discharging the slaughtered animals or parts thereof from one of the slits of said conveyance means via one end of the slit concerned, wherein first conveyance control means for taking the feed end of a predetermined one of said slits into the receiving position are provided, the slit being determined on the basis of data fed to first conveyance control means, relating to slaughtered animals or parts thereof, and on the basis of data stored in said first conveyance control means, relating to slaughtered animals or parts thereof situated in the slits of said conveyance means.

38. A conveyor device for receiving slaughtered animals or parts thereof at a first point and releasing slaughtered animals or parts thereof at a second point, comprising:

a movable, endless conveyance means, along the path of which the first and the second point are situated, feed means for feeding the slaughtered animals or parts thereof at the first point to the conveyance means in a receiving position;

and discharge means for discharging the slaughtered animals or parts thereof from the conveyance means at the second point, in a releasing position, wherein:

said conveyance means is provided with a number of slits which are open at least at a feed end, and which are each equipped for supporting in a bearing manner therein at least two slaughtered animals or parts thereof;

said feed means are adapted for feeding the slaughtered animals or parts thereof to the feed end of one of the slits of said conveyance means; and said discharge means are adapted for discharging the slaughtered animals or parts thereof from one of the slits of said conveyance means via one end of the slit concerned, wherein provision is made for second conveyance control means, for taking the end of a predetermined slit into the releasing position, the slit being determined on the basis of data fed to second conveyance control means, relating to slaughtered animals or parts thereof to be released, and on the basis of data stored in said second conveyance control means, relating to slaughtered animals or parts thereof situated in the slits of said conveyance means.

39. A conveyor device for receiving slaughtered animals or parts thereof at a first point and releasing slaughtered animals or parts thereof at a second point, comprising:

a movable, endless conveyance means, along the path of which the first and the second point are situated, feed means for feeding the slaughtered animals or parts thereof at the first point to the conveyance means in a receiving position;

and discharge means for discharging the slaughtered animals or parts thereof from the conveyance means at the second point, in a releasing position, wherein:

said conveyance means is provided with a number of slits which are open at least at a feed end, and which are each equipped for supporting in a bearing manner therein at least two slaughtered animals or parts thereof;

said feed means are adapted for feeding the slaughtered animals or parts thereof to the feed end of one of the slits of said conveyance means; and said discharge means are adapted for discharging the slaughtered animals or parts thereof from one of the slits of said conveyance means via one end of the slit concerned, wherein said discharge means are equipped to interact with a conveyor in which the slaughtered animals or parts thereof are moved according to a predetermined path from said second point, said discharge means comprising an ejection mechanism which can be taken into a first position in which the slaughtered animals or parts thereof are not removed from said conveyance means, and, synchronized with said conveyance means, can be taken into a second position, in which the slaughtered animals or parts thereof are removed from said conveyance means, one by one or several at a time, and fed to said conveyor.

40. The device of claim 39, wherein said ejection mechanism contains at least two movable guides which can move the slaughtered animals or parts thereof, one by one or several at a time, in the lengthwise direction of each slit.

41. The device of claim 39, wherein said discharge means comprise at least one stationary waiting slit, in which said ejection mechanism places the slaughtered animals or parts thereof removed from said conveyance means in said second position thereof.

42. The device of claim 41, wherein said discharge means comprise an infeed mechanism which can be taken into a first position, in which the slaughtered animals or parts thereof remain in their waiting slit and, synchronized with said conveyor, can be taken into a second position, in which the slaughtered animals or parts thereof are fed into said conveyor from said waiting slit.

* * * * *